US011087091B2

(12) United States Patent
Agnihotram et al.

(10) Patent No.: US 11,087,091 B2
(45) Date of Patent: Aug. 10, 2021

(54) METHOD AND SYSTEM FOR PROVIDING CONTEXTUAL RESPONSES TO USER INTERACTION

(71) Applicant: Wipro Limited, Bangalore (IN)

(72) Inventors: Gopichand Agnihotram, Bangalore (IN); Rajesh Kumar, Patna (IN); Pandurang Naik, Pune (IN)

(73) Assignee: Wipro Limited, Bangalore (IN)

( * ) Notice: Subject to any disclaimer, the term of this patent is extended or adjusted under 35 U.S.C. 154(b) by 150 days.

(21) Appl. No.: 16/278,786

(22) Filed: Feb. 19, 2019

(65) Prior Publication Data

US 2020/0210528 A1 Jul. 2, 2020

(30) Foreign Application Priority Data

Dec. 27, 2018 (IN) .............................. 201841049483

(51) Int. Cl.
*G06F 40/30* (2020.01)
*G06K 9/00* (2006.01)
*G10L 15/22* (2006.01)
*G10L 25/63* (2013.01)

(52) U.S. Cl.
CPC ......... *G06F 40/30* (2020.01); *G06K 9/00302* (2013.01); *G06K 9/00335* (2013.01); *G10L 15/22* (2013.01); *G10L 25/63* (2013.01)

(58) Field of Classification Search
CPC .... G06F 40/30; G06F 40/284; G06F 16/3334; G06K 9/00302; G06K 9/00335; G06K 9/6215; G10L 15/22; G10L 25/63; H04L 51/02
See application file for complete search history.

(56) References Cited

U.S. PATENT DOCUMENTS

| 9,105,266 | B2* | 8/2015 | Baldwin | ............ G06Q 30/0241 |
| 10,068,588 | B2* | 9/2018 | Khan | ...................... G10L 15/22 |
| 10,219,122 | B1* | 2/2019 | Scanlon | .................. H04W 4/14 |
| 10,680,989 | B2* | 6/2020 | Anders | ................. H04L 67/306 |
| 10,764,534 | B1* | 9/2020 | Shevchenko | ......... G06F 40/232 |

(Continued)

FOREIGN PATENT DOCUMENTS

| CN | 104835507 A | 8/2015 |
| CN | 106250855 A | 12/2016 |
| CN | 107220591 A | 9/2017 |

*Primary Examiner* — Mohammad K Islam
(74) *Attorney, Agent, or Firm* — Finnegan, Henderson, Farabow, Garrett & Dunner, LLP

(57) ABSTRACT

Disclosed herein is a method and response generation system for providing contextual responses to user interaction. In an embodiment, input data related to user interaction, which may be received from a plurality of input channels in real-time, may be processed using processing models corresponding to each of the input channels for extracting interaction parameters. Thereafter, the interaction parameters may be combined for computing a contextual variable, which in turn may be analyzed to determine a context of the user interaction. Finally, responses corresponding to the context of the user interaction may be generated and provided to the user for completing the user interaction. In some embodiments, the method of present disclosure accurately detects context of the user interaction and provides meaningful contextual responses to the user interaction.

14 Claims, 5 Drawing Sheets

(56) References Cited

U.S. PATENT DOCUMENTS

| | | | |
|---|---|---|---|
| 10,817,670 B2* | 10/2020 | Galitsky | G06F 40/253 |
| 2009/0157408 A1* | 6/2009 | Kim | G10L 13/08 |
| | | | 704/260 |
| 2015/0294377 A1* | 10/2015 | Chow | G06Q 30/0282 |
| | | | 705/347 |
| 2016/0098386 A1* | 4/2016 | Rangarajan Sridhar | |
| | | | G06F 40/58 |
| | | | 704/9 |
| 2016/0259775 A1* | 9/2016 | Gelfenbeyn | G10L 15/26 |
| 2016/0313868 A1* | 10/2016 | Weng | H04L 67/12 |
| 2017/0228367 A1* | 8/2017 | Pasupalak | G06F 40/40 |
| 2018/0068031 A1* | 3/2018 | Hewavitharana | G06F 16/3329 |
| 2018/0137551 A1* | 5/2018 | Zheng | G06K 9/00442 |
| 2018/0174020 A1* | 6/2018 | Wu | G06N 3/08 |
| 2018/0276273 A1* | 9/2018 | Mittal | G06F 40/30 |
| 2018/0366114 A1* | 12/2018 | Anbazhagan | G06F 9/4451 |
| 2018/0375947 A1* | 12/2018 | Hodges | H04L 67/10 |
| 2019/0042933 A1* | 2/2019 | Powell | G06N 20/00 |
| 2019/0042988 A1* | 2/2019 | Brown | G06Q 10/0631 |
| 2019/0102078 A1* | 4/2019 | Bhatt | G06F 3/04847 |
| 2019/0258967 A1* | 8/2019 | Gonzalez | G06Q 50/14 |
| 2019/0324553 A1* | 10/2019 | Liu | G06F 3/011 |
| 2020/0057946 A1* | 2/2020 | Singaraju | G06N 5/022 |
| 2020/0117858 A1* | 4/2020 | Freeman | G06F 40/117 |
| 2020/0279017 A1* | 9/2020 | Norton | G06F 16/36 |
| 2020/0335120 A1* | 10/2020 | Candelore | G10L 21/10 |

* cited by examiner

METHOD AND SYSTEM FOR PROVIDING CONTEXTUAL RESPONSES TO USER INTERACTION

TECHNICAL FIELD

The present subject matter is, in general, related to generating automated responses and more particularly, but not exclusively, to method and system for providing contextual responses to user interaction.

BACKGROUND

Automated response generation systems, popularly known as chatbots, are a set of computer programs or artificial intelligence, which conduct conversation with a user via audio/visual or textual methods. Such systems are often designed to convincingly simulate how a human would behave and respond as a conversational partner to the user. One of the major challenges with the chatbots is emulation of human conversation in an exact context of an ongoing conversation with the user.

Some of the existing chatbots detect the context of the conversation based on parameters such keywords used in the conversation and sentiment of the user. However, the existing chatbots exhibit poor performance in terms of their accuracy, since all the parameters associated with a conversation are not evaluated for the detection of context. Hence, the existing chatbots may not be effective in providing accurate responses to users due to lack of understanding of the context of the conversation. Therefore, it would be desirable to have a system that effectively detects the context of the conversation and generates accurate responses during the conversation.

The information disclosed in this background of the disclosure section is only for enhancement of understanding of the general background of the invention and should not be taken as an acknowledgement or any form of suggestion that this information forms the prior art already known to a person skilled in the art.

SUMMARY

Disclosed herein is a method for providing contextual responses to user interaction. The method comprises receiving, by a response generation system, input data related to the user interaction from each of a plurality of input channels in real-time. Further, the method comprises processing the input data using one or more processing models corresponding to each of the plurality of input channels for extracting plurality of interaction parameters from the input data. Thereafter, the method comprises combining each of the plurality of interaction parameters for computing a contextual variable corresponding to the user interaction. Upon computing the contextual variable, the method comprises determining a context of the user interaction based on analysis of the contextual variable. Finally, the method comprises generating one or more responses corresponding to the context of the user interaction for providing the contextual responses to the user interaction.

Further, the present disclosure relates to a response generation system for providing contextual responses to user interaction. The response generation system comprises a processor and a memory. The memory is communicatively coupled to the processor and stores processor-executable instructions, which on execution, cause the processor to receive input data related to the user interaction from each of a plurality of input channels in real-time. Further, the instructions cause the processor to process the input data using one or more processing models corresponding to each of the plurality of input channels to extract plurality of interaction parameters from the input data. Thereafter, the instructions cause the processor to combine each of the plurality of interaction parameters for computing a contextual variable corresponding to the user interaction. Subsequent to computing the contextual variable, the instructions cause the processor to determine a context of the user interaction based on analysis of the contextual variable. Finally, the instructions cause the processor to generate one or more responses corresponding to the context of the user interaction to provide the contextual responses to the user interaction.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 1:
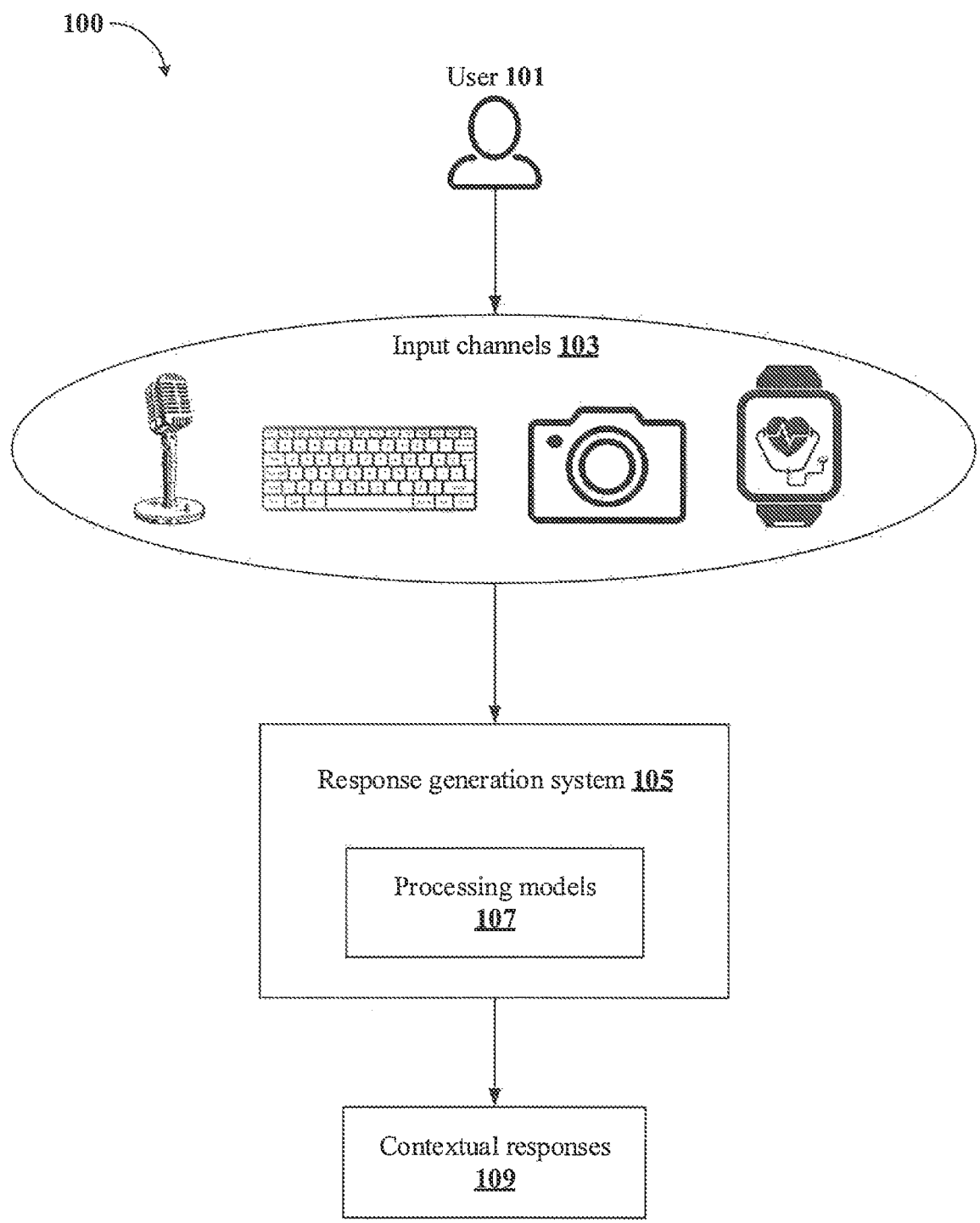
FIG. 1 illustrates an exemplary environment for providing contextual responses to user interaction in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the spirit and the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Automated systems such as chatbots and avatar-based virtual systems may be used in various applications such as customer care teleservices, virtual interviews and automated information kiosks for carrying out a human-like conversation with users. Effectiveness of such systems may be decided by determining how meaningful or how interactive the conversation has been, and whether the conversation was comparable to a natural human-like conversation. The conversation may become meaningful, interactive and match the natural human-like conversation only when the responses provided by the automated systems are in same context of an ongoing conversation. Accordingly, the present disclosure discloses a method and a response generation system for providing contextual responses to user interaction. The method and system of the present disclosure relate to contextual event detection. Particularly, the method and system of the present disclosure relate to blending of multi-modal input data obtained from the user interaction to detect the context of the user interaction in real-time. In some embodiments, the present disclosure discloses collecting various data related to the user interaction from different modalities such as voice, video, sensory and textual data output modalities and fusing the collected data in an efficient manner using user-specific or group-specific learning models. That is, the present disclosure uses a model-based approach for multi-modal data blending and detecting context of the user interaction.

Further, the model-based approach may include two steps. First step is performed at a micro level, where individual learning models such as voice based, vision based, textual based or sensor-based models are used to extract the features of individual data types such as voice, vision, text and sensory data respectively, from data related to the user interaction. Subsequently, each of the individual learning models are trained with features of the respective data types. The second step is performed at a macro level, where the trained learning models are used to blend the input data of various types to derive a blended data output. Finally, an accurate prediction of the context of the user interaction is made based on the blended data output.

In an embodiment, the present disclosure also uses a goal-oriented approach, which may be used to predict a final outcome of the user interaction based on the contextual responses provided to the user. For instance, the goal-oriented approach may be helpful in determining whether the final outcome of the user interaction is a positive or a negative outcome. For example, suppose, during the user interaction, the user has revealed that the user wants to purchase a product. Suppose, the context of the user interaction is determined to be 'Happy', but the goal-oriented approach predicts a 'Negative' outcome for the user interaction. This may mean that the user has not actually purchased the product, in contrary to what was revealed in the user interaction. This may be due to various reasons such as cost of the product, availability of the product and the like. Thus, the goal-oriented approach may be used to predict the final outcome of the user interaction.

Similarly, in an interview scenario, the goal-oriented approach may be used for assessing the answers provided by a candidate. Suppose, during the interview, facial expressions of the candidate are indicating that the candidate is confident about the interview. However, suppose the goal-oriented approach indicates a 'Negative' outcome. This may mean that the candidate is confident, but the candidate is providing incorrect answers. Accordingly, the response generation system may change the context of the user interaction and may ask easier questions to the candidate.

Thus, the method and system of the present disclosure perform efficient blending of all available multi-modal input data for detecting context of the user interaction and generating accurate and precise responses to the user interaction.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an exemplary environment for providing contextual responses 109 to user interaction in accordance with some embodiments of the present disclosure.

In some implementations, the environment 100 may include a user 101, a plurality of input channels 103 and a response generation system 105. The user 101 may be a customer, an interviewee or any person carrying out an interaction with the response generation system 105. The plurality of input channels 103 are the means that capture and/or collect input data related to user transaction from the user 101 and transmit it to the response generation system 105. As an example, the plurality of input channels 103 may include, without liming to, a voice input channel, a textual input channel, a visual input channel and a sensory input channel. In an embodiment, the response generation system 105 may be configured to receive the input data from the plurality of input channels 103, process the input data and provide contextual responses 109 to the user interaction. In an embodiment, the response generation system 105 may be implemented in a location of the user 101. In another embodiment, the response generation system 105 may be implemented and operated from a remote location. Further, the response generation system 105 may be any computing device including, but not limited to, a desktop computer, a laptop, a smartphone and the like.

In an embodiment, the input data related to the user interaction may be in various forms and/or data types including, but not limiting to, voice input, textual input, visual input and sensory input. For example, the voice input may be user utterances during the user interaction. Textual input may be the text obtained by performing voice-to-text conversion of the user utterances. Alternatively, the textual input may also be received from the user 101, when the user 101 manually types the input data using an input device such as a keyboard associated with the textual input channel. Further, the visual input may include gestures, facial expressions and other physical behaviour of the user 101 during the user utterance. The sensory data may include various physiological parameters such as heart rate and blood pressure of the user 101, sensed by one or more sensors configured and/or placed with the user 101. As an example, the one or more sensors used for the above purpose may include, without limiting to, a blood pressure monitoring sensor, a heart rate monitoring sensor or a temperature sensor associated with the user 101.

In an embodiment, each type of the input data may be received using one of the plurality of input channels 103 corresponding to the type of the input data. That is, the voice input may be received through the voice input channel. Similarly, textual input, visual input and sensory input may be received through the textual input channel, visual input channel and the sensory input channel respectively.

In an embodiment, upon receiving the input data, the response generation system 105 may process the input data using one or more processing models 107 configured in the response generation system 105. In an embodiment, each of the one or more processing models 107 may correspond to each of the plurality of input channels 103. The one or more processing models 107 may be configured with predetermined techniques for processing the input data received from each of the corresponding plurality of input channels 103 and extracting plurality of interaction parameters from the input data. As an example, the plurality of interaction parameters may include, without limiting to, emotion of a user 101, gestures and facial expressions of the user 101 and values of physiological factors associated with the user 101.

In an embodiment, once the interaction parameters are extracted from the input data, the response generation system 105 may combine each of the plurality of interaction parameters for computing a contextual variable corresponding to the user interaction. In other words, the contextual variable may be indicative of a collective outcome of processing the input data by the one or more processing models 107. Further, the response generation system 105 may determine a context of the user interaction based on analysis of the contextual variable. In an embodiment, determining the context of the user interaction includes assigning a context score to the contextual variable. The context score may be assigned based on comparison of the contextual variable with each of a plurality of predetermined emotion variables stored in the response generation system 105. As an example, suppose the predetermined emotion variables stored in the response generation system 105 are, without limitation, 'happy', 'sad' and 'angry'. Further, suppose, the contextual variable computed in real-time by the response generation system 105 is 'happy'. Here, the context of the user interaction may be determined by comparing the real-time contextual variable with each of the predetermined emotion variables and scoring the real-time contextual variable according to its relevance with each of the predetermined emotion variables. In the above example, the predetermined emotion variable 'happy' may be assigned with highest context score, since the real-time contextual variable matches with the predetermined emotion variable 'happy'. Subsequently, the context of the user interaction may be determined as 'happy', which indicates that the user interaction is progressing in a 'happy' context or on a positive note.

In an embodiment, subsequent to determining the context of the user interaction, the response generation system 105 may generate one or more responses corresponding to the context of the user interaction for providing the contextual responses 109 to the user interaction. In an embodiment, the one or more responses may be provided to the user 101 in various forms including, but not limited to, an audio response and textual and/or visual response on a display interface associated with the response generation system 105 and the user 101.

Figure 2A:
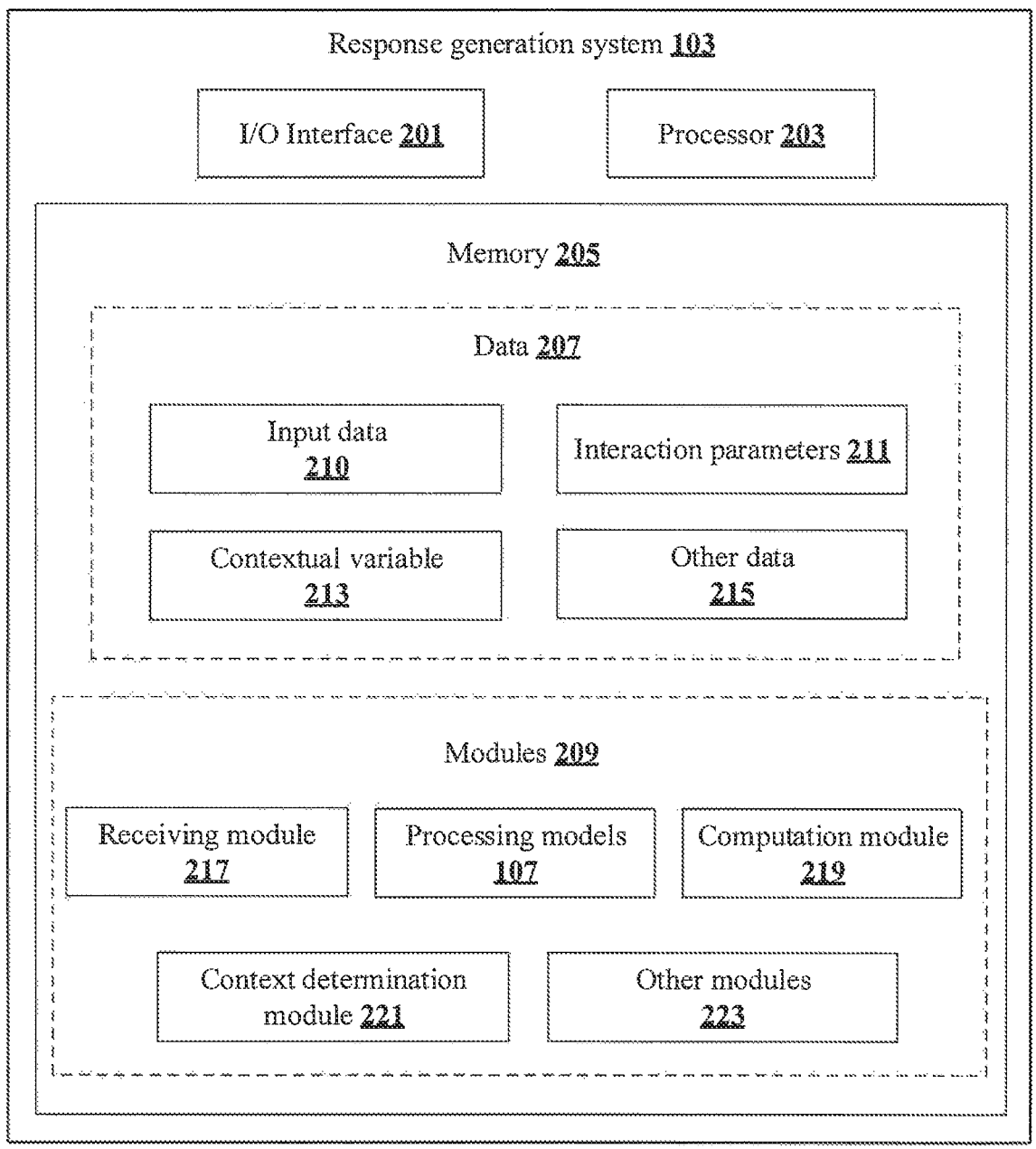
FIG. 2A shows a detailed block diagram illustrating a response generation system in accordance with some embodiments of the present disclosure.

FIG. 2A shows a detailed block diagram illustrating a response generation system 105 in accordance with some embodiments of the present disclosure.

In some implementations, the response generation system 105 may include an I/O interface 201, a processor 203, and a memory 205. The I/O interface 201 may be configured to manage a plurality of input channels 103 for receiving input data 210 related to the user interaction. The memory 205 may be communicatively coupled to the processor 203 and may store data 207 and one or more modules 209. The processor 203 may be configured to perform one or more functions of the response generation system 105 while providing contextual responses 109 to the user interaction.

In an embodiment, the data 207 may include, without limitation, input data 210, interaction parameters 211, contextual variable 213 and other data 215. In some implementations, the data 207 may be stored within the memory 205 in the form of various data structures. Additionally, the data 207 may be organized using data models, such as relational or hierarchical data models. The other data 215 may store various temporary data and files generated by one or more modules 209 while performing various functions of the response generation system 105. As an example, the other data 215 may include a context of the user interaction, one or more responses generated by the response generation system 105 and the like.

In an embodiment, the input data 210 may be related to the user interaction between the user 101 and the response generation system 105. The input data 210 may include all the utterances, expressions and responses generated by the user 101, while the user 101 is interacting with the response generation system 105. As an example, the input data 210 may include various types of inputs including, without limiting to, voice, text, visual and sensory data related to the user 101. In an embodiment, the response generation system 105 may receive the input data 210 in real-time, using a plurality of input channels 103 associated with the user 101 and the response generation system 105.

In an embodiment, the plurality of interaction parameters 211 are extracted from the input data 210. That is, the plurality of interaction parameters 211 may be obtained by processing the input data 210 using one or more processing models 107 corresponding to each of the plurality of input channels 103 of the input data 210. As an example, the plurality of interaction parameters 211 may include, without limiting to, emotions of the user 101, gestures and facial expressions of the user 101 and values of physiological factors associated with the user 101. The plurality of interaction parameters 211 help in deriving useful information about the context of the user interaction.

In an embodiment, the contextual variable 213 may be computed by combining each of the plurality of interaction parameters 211 of the input data 210. In other words, the contextual variable 213 may be computed as an aggregation of the plurality of interaction parameters 211 corresponding to each of the plurality of channels. The contextual variable 213 may be indicative of the context of the user interaction and may be used for determining an exact context of the user interaction.

In an embodiment, each of the data 207 may be processed by the one or more modules 209. In some implementations, the one or more modules 209 may be communicatively coupled to the processor 203 for performing one or more functions of the response generation system 105. In an implementation, the one or more modules 209 may include, without limiting to, a receiving module 217, the processing models 107, a computation module 219, a context determination module 221 and other modules 223.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. In an embodiment, the other modules 223 may be used to perform various miscellaneous functionalities of the response generation system 105. It will be appreciated that such one or more modules 209 may be represented as a single module or a combination of different modules.

In an embodiment, the receiving module 217 may be configured for capturing and/or receiving the input data 210 related to the user interaction. The receiving module 217 may receive the input data 210 through a plurality of input channels 103 associated with the user 101 and the response generating system. As an example, the plurality of input channels 103 may include, without limiting to, a voice input channel, a textual input channel, a visual input channel and a sensory input channel.

In an implementation, the receiving module 217 may capture the input data 210 using a predetermined application installed in a computing device associated with the user 101. For example, the predetermined application may be installed on a laptop or a desktop computer of the user 101 to capture all the input data 210 produced by the user 101 in real-time. The predetermined application may have a provision to capture all the user 101 logs such as voice utterances, textual inputs, visual information and sensory information. In an embodiment, the voice utterances may be captured using a microphone attached to the computing device of the user 101. The textual inputs may be captured through a keyboard and/or a touchpad of the computing device or by performing a voice-to-text conversion of the voice utterances. The visual information may be captured using an image and/or video capturing device associated with the computing device of the user 101. Similarly, the sensory information may be obtained using one or more sensors placed on the user 101. As an example, the sensory information such as heart rate, blood pressure and other physiological parameters of the user 101 may be obtained using a smart band or a smart wristwatch associated with the user 101.

In an embodiment, the one or more processing models 107 configured in the response generation system 105 may be used for processing the input data 210 received from each of the plurality of input channels 103 for extracting the plurality of interaction parameters 211 from the input data 210. In an embodiment, each of the one or more processing models 107 may be trained on historical input data 210 using a predetermined technique such as a deep learning technique or a machine learning classifier. Upon training, each of the one or more processing models 107 may be capable of extracting plurality of interaction parameters 211 from each of the plurality of input channels 103. As an example, a processing model which is trained with historical voice inputs may be used for extracting voice related interaction parameters 211 from the real-time user 101 input. Similarly, a processing model which is trained with historical visual inputs may be used for detecting facial expressions and associated user emotions from the real-time user input.

Figure 2B:
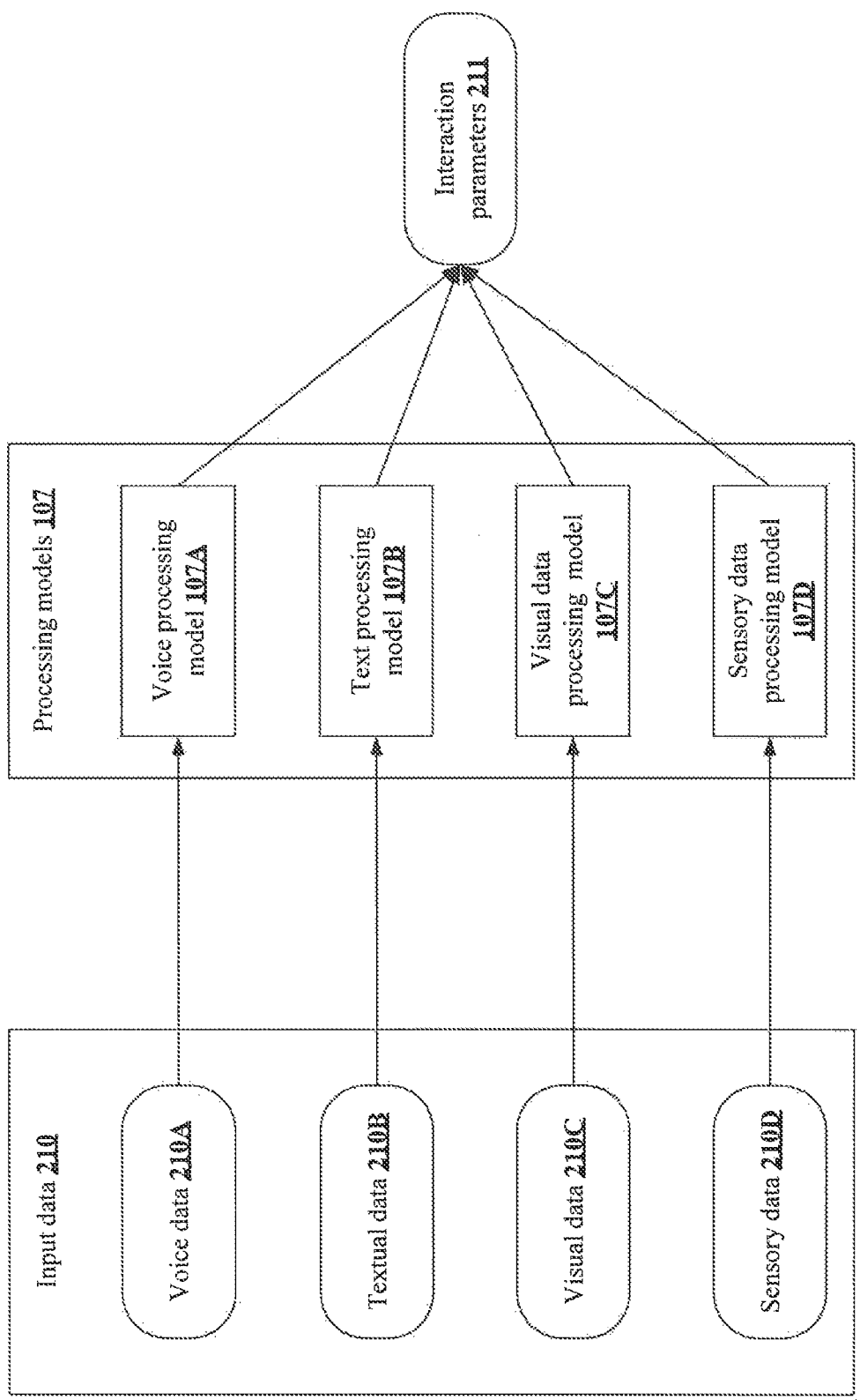
FIG. 2B is an exemplary illustration of a method of processing input data using various processing models of the response generation system in accordance with some embodiments of the present disclosure.

FIG. 2B provides an exemplary illustration of using multiple processing models 107 for processing the input data 210 of different types to extract the interaction parameters 211. As shown in FIG. 2B, various input data 210 including voice data 101A, textual data 101B, visual data 101C and sensory data 101D may be respectively processed by the processing models 107 including a voice processing model 105A, a text processing model 105B, a visual data processing model 105C and a sensory data processing model 105D. Finally, the interaction parameters 211 extracted by each of the processing models 107 may be collectively analysed for determining a contextual variable 213 corresponding to the user interaction.

In an embodiment, the computation module 219 may be configured for computing the contextual variable 213 corresponding to the user interaction by combining each of the plurality of interaction parameters 211. Computation of the contextual variable 213 may be realized with the following example.

Suppose, the input data 210 related to the user interaction is received from three input channels 103 namely, a voice input channel, a visual input channel and a sensory input channel. Let the processing models 107 corresponding to each of the three input channels 103 may be represented as $X_1$, $X_2$ and $X_3$. Also, suppose the outcome of each of the three processing models 107 $X_1$, $X_2$ and $X_3$ be represented as $X_1^{(i)}$, $X_2^{(i)}$ and $X_3^{(i)}$ respectively. Then, the contextual variable "$Y_1$" obtained by combining the outcome of each of the three processing models 107 may be as represented in equation (1) below:

$$Y_i = g(X_1^{(i)}, X_2^{(i)}, X_3^{(i)}) \qquad (1)$$

Wherein, $X_1^{(i)}$ is $X_1^{(i)} = f_1(X_{11}, X_{12}, \ldots, X_{1n})$, such that $X_1^{(i)}$ represents a voice processing model trained for processing various features of real-time voice inputs $-X_{11}, X_{12}, \ldots, X_{1n}$. In an embodiment, the model $X_1^{(i)}$ may be modeled using any of the existing techniques such as logistic regression. Further, the interaction parameters 211 that may be extracted using the model $X_1^{(i)}$ may include user emotions such as happy, sad, angry and the like.

Wherein, $X_2^{(i)}$ is $X_2^{(i)} = f_2(X_{21}, X_{22}, \ldots, X_{2n})$, such that $X_2^{(i)}$ represents a visual processing model trained for processing real-time visual inputs $-X_{21}, X_{22}, \ldots, X_{2n}$. In an embodiment, the model $X_2^{(i)}$ may be trained using any existing technology such as deep learning technique. Further, the interaction parameters 211 that may be extracted using the model $X_2^{(i)}$ may include user emotions such as happy, sad, angry and the like, which may be derived from facial expressions and gestures made by the user 101.

wherein $X_3^{(i)}$ is $X_3^{(i)} = f_3(X_{31}, X_{32}, \ldots, X_{3n})$, such that, $X_3^{(i)}$ represents a sensory data processing model which is trained for processing the real-time sensory inputs $X_{31}, X_{32}, \ldots, X_{3n}$. In an embodiment, the sensory parameters such as heart rate, pulse rate and blood pressure of the user 101, along with possible variations may be used for training the model $X_3^{(i)}$. As an example, the model $X_3^{(i)}$ may be trained using an existing technique such as multilinear regression analysis.

That is, each of the one or more processing models 107 corresponding to each of the plurality of input channels 103 may be used to simultaneously process the real-time input data 210 and compute a blended output, which represents the contextual variable 213 of the user interaction. In other words, the blended model approach illustrated in equation (1) combines accuracy of each of the individual models $X_1^{(i)}$, $X_2^{(i)}$, $X_3^{(i)}$ and computes a more accurate outcome, that is, the contextual variable $Y_i$.

In an embodiment, the context determination module 221 may be used for determining a context of the user interaction based on analysis of the contextual variable 213. Once the contextual variable 213 is computed, for example, using the equation (1) illustrated above, the context determination module 221 may assign a context score to the contextual variable 213. In an embodiment, the context score may be assigned based on comparison of the contextual variable 213 with each of a plurality of predetermined emotion variables stored in the response generation system 105. Subsequently, the context score may be used to determine a most relevant emotion variable corresponding to the contextual variable 213. As an example, the emotion variable having a highest context score may be identified as the emotion variable corresponding to the contextual variable 213. Further, the context determination module 221 may determine the context of the user interaction based on the identified emotion variable. Suppose, if the identified emotion variable is 'Happy', then the context of the user interaction may be determined to be a 'positive' context.

As an example, for the blended model Y illustrated in equation (1), the context score corresponding to emotion variables—Happy, Sad and Angry may be computed as shown below:

$$\text{Context score for the emotion variable Happy} = P(\hat{Y}_i=1) \quad (2)$$

Wherein, $0 <= P(\hat{Y}_i=1) <= 1$ $$\text{Context score for the emotion variable Sad} = P(\hat{Y}_i=2) \quad (3)$$

Wherein, $0 <= P(\hat{Y}_i=2) <= 1$ $$\text{Context score for the emotion variable Angry} = P(\hat{Y}_i=3) \quad (4)$$

Wherein, $0 <= P(\hat{Y}_i=3) <= 1$

Here, the context of the contextual variable 213 derived from $Y_i$ may be determined as the context corresponding to the emotion variable having highest context score. That is, suppose if the context score $P(\hat{Y}_i=1)$ corresponding to the emotion variable 'Happy' is greater than the context scores $P(\hat{Y}_i=2)$ and $P(\hat{Y}_i=3)$, then the emotion variable 'Happy' may be selected.

In an embodiment, in addition to using the one or more processing models 107 for determining the context of the user interaction, the response generation system 105 may use the outcome of a goal-oriented prediction model '$Z_i$' for determining the context of the user interaction. In an embodiment, similar to training of the blended model $Y_i$, the goal-oriented prediction model $Z_i$ may be trained with the latent variables $X_1^{(i)}$, $X_2^{(i)}$, $X_3^{(i)}$ to determine the final intent and/or user's response to the contextual responses 109 provided to the user 101.

In an embodiment, the outcome of the goal-oriented prediction model $Z_i$ indicates final user response to the contextual responses 109 and/or emotion variables presented to the user 101. As an example, the final user response may be classified into one of user acceptance or user rejection to the contextual responses 109. In an embodiment, decision of acceptance or rejection of the contextual responses 109 may be determined based on a probability score associated with the model $Z_i$ as illustrated in equations (5) and (6) below:

$$\text{Probability of a successful or an acceptable response} = P(\hat{Z}_i=1) \quad (5)$$

Wherein, $<= P(\hat{Z}_i=1) <= 1$ $$\text{Probability of a failure or a rejection of response} = P(\hat{Z}_i=0) \quad (6)$$

Wherein, $<= P(\hat{Z}_i=0) <= 1$

That is, the goal-oriented prediction model $Z_i$ helps in deriving user's final intention or final outcome towards an action. Thus, the outcome of the goal-oriented prediction model $Z_i$ helps in generating more meaningful responses to the user interaction, thereby making the user interaction more interactive, contextually meaningful and comparable to natural human-like conversation.

Figure 3:
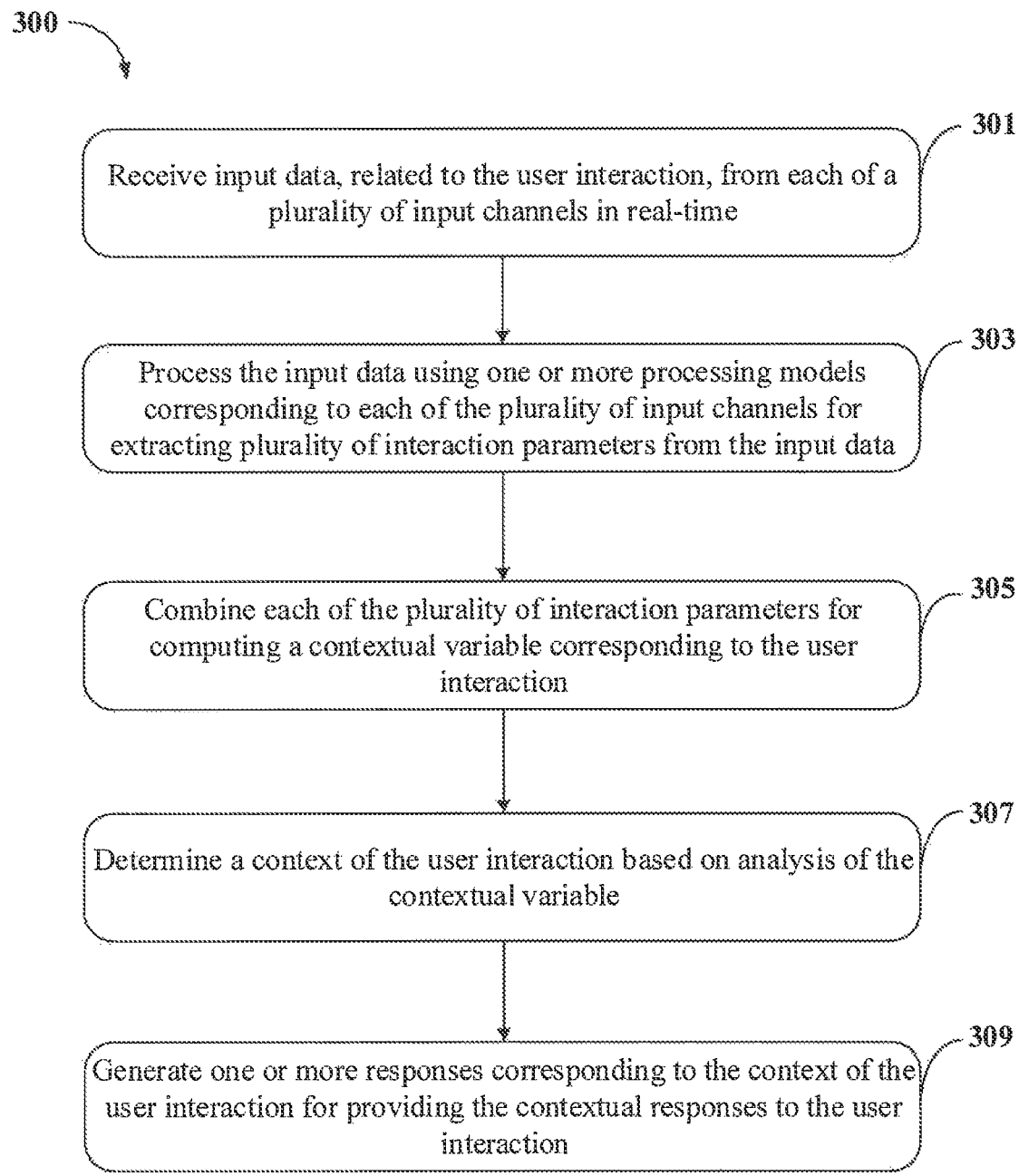
FIG. 3 shows a flowchart illustrating a method of providing contextual responses to user interaction in accordance with some embodiments of the present disclosure.

FIG. 3 shows a flowchart illustrating a method of providing contextual responses 109 to user interaction in accordance with some embodiments of the present disclosure.

As illustrated in FIG. 3, the method 300 may include one or more blocks illustrating a method of providing contextual responses 109 to user interaction using a response generation system 105 shown in FIG. 1. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the method 300 includes receiving, by the response generation system 105, input data 210 related to the user interaction from each of a plurality of input channels 103 in real-time. In an embodiment, the plurality of input channels 103 may include, without limiting to, a voice input channel, a textual input channel, a visual input channel and a sensory input channel.

At block 303, the method 300 includes processing, by the response generation system 105, the input data 210 using one or more processing models 107 corresponding to each of the plurality of input channels 103 for extracting plurality of interaction parameters 211 from the input data 210. In an embodiment, each of the one or more processing models 107 may be configured with predetermined techniques for processing the input data 210 received from corresponding each of the plurality of input channels 103. Further, each of the one or more processing models 107 may be trained with historical input data 210 for identifying the plurality of interaction parameters 211 in the input data 210.

At block 305, the method 300 includes combining, by the response generation system 105, each of the plurality of interaction parameters 211 for computing a contextual variable 213 corresponding to the user interaction. As an example, the plurality of interaction parameters 211 may include, without limiting to, emotion of a user 101, gestures and facial expressions of the user 101 and physiological factors associated with the user 101.

At block 307, the method 300 includes determining, by the response generation system 105, a context of the user interaction based on analysis of the contextual variable 213. In an embodiment, determining the context of the user interaction may include assigning a context score to the contextual variable 213 based on comparison of the contextual variable 213 with each of a plurality of predetermined emotion variables. Thereafter, an emotion variable corresponding to the contextual variable 213 may be identified based on the context score. Finally, the context of the user interaction may be determined based on identified emotion variable.

At block 309, the method 300 includes generating, by the response generation system 105, one or more responses corresponding to the context of the user interaction for providing the contextual responses 109 to the user interaction. In some embodiments, the response generation system 105 may further include training a goal-oriented prediction model with historical contextual variables and outcome of corresponding user interactions for predicting an outcome of the user interaction. As an example, the outcome of the user interaction may be at least one of user acceptance or user rejection to the contextual responses 109 provided to the user 101.

Computer System

Figure 4:
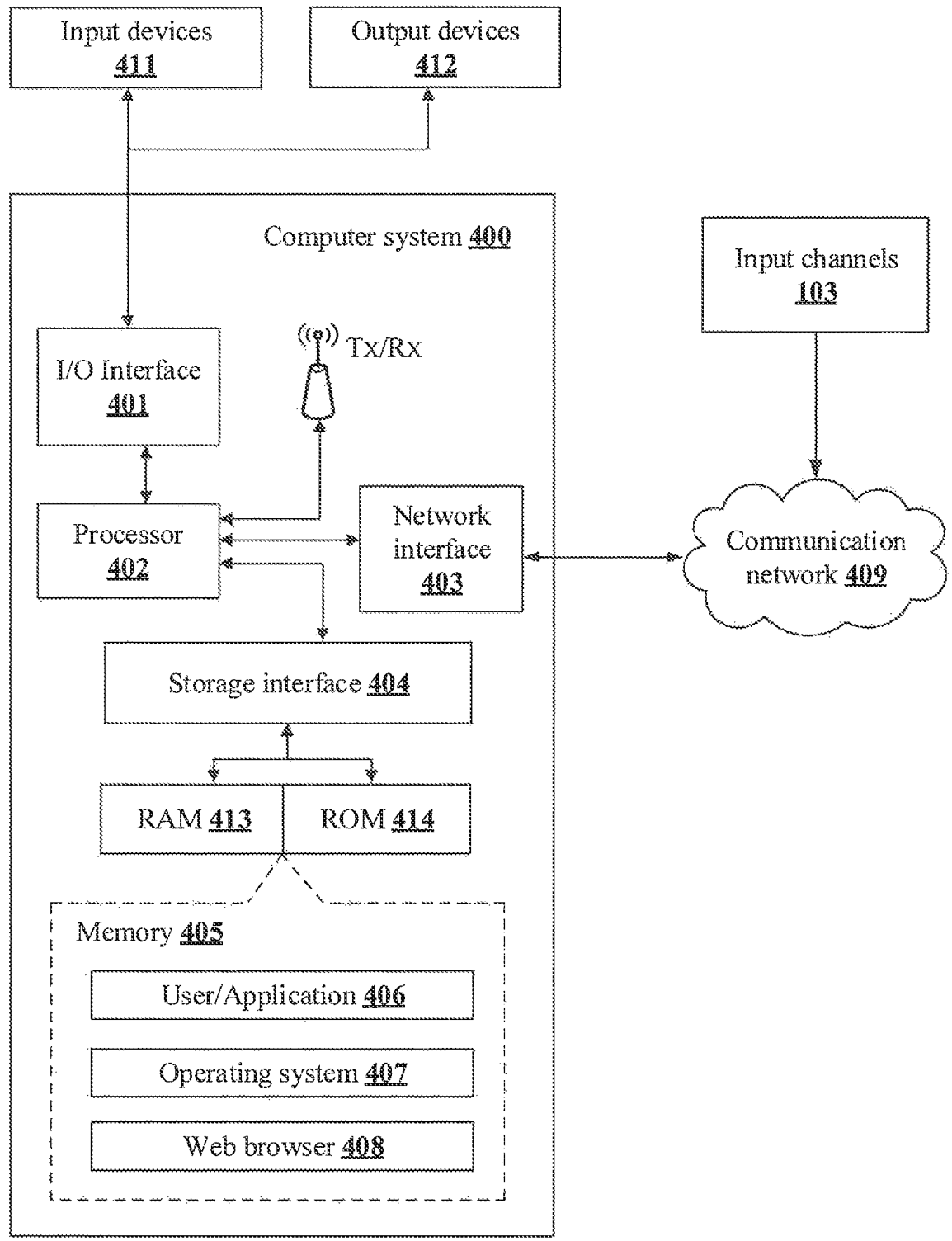
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be a response generation system 105 shown in FIG. 1, which may be used for providing contextual response to user interaction. The computer system 400 may include a central processing unit ("CPU" or "processor") 402. The processor 402 may comprise at least one data processor for executing program components for executing user- or system-generated business processes. A user may include a person, a user in the environment 100, an interview candidate, a customer or any system/sub-system being operated parallelly to the computer system 400. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE®-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE® 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 401, the computer system 400 may communicate with one or more I/O devices 411 and 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE® 802.11a/b/g/n/x, etc. Using the network interface 403 and the communication network 409, the computer system 400 may connect to a plurality of input channels 103 for receiving input data 210 related to the user interaction.

In an implementation, the communication network 409 can be implemented as one of the several types of networks, such as intranet or Local Area Network (LAN) and such within the organization. The communication network 409 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application interface 406, an operating system 407, a web browser 408, and the like. In some embodiments, computer system 400 may store user/application data 406, such as the data, variables, records, etc. as described in this invention. Such databases may be implemented as fault-tolerant, relational, scalable, secure databases such as Oracle® or Sybase®.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

The user interface 406 may facilitate display, execution, interaction, manipulation, or operation of program components through textual or graphical facilities. For example, the user interface 406 may provide computer interaction interface elements on a display system operatively connected to the computer system 400, such as cursors, icons, check boxes, menus, scrollers, windows, widgets, and the like. Further, Graphical User Interfaces (GUIs) may be employed, including, without limitation, APPLE® MACINTOSH® operating systems' Aqua®, IBM® OS/2®, MICROSOFT® WINDOWS® (e.g., Aero, Metro, etc.), web interface libraries (e.g., ActiveX®, JAVA®, JAVASCRIPT®, AJAX, HTML, ADOBE® FLASH®, etc.), or the like.

The web browser 408 may be a hypertext viewing application. Secure web browsing may be provided using Secure Hypertext Transport Protocol (HTTPS), Secure Sockets Layer (SSL), Transport Layer Security (TLS), and the like. The web browsers 408 may utilize facilities such as AJAX, DHTML, ADOBE® FLASH®, JAVASCRIPT®, JAVA®, Application Programming Interfaces (APIs), and the like.

Further, the computer system 400 may implement a mail server stored program component. The mail server may utilize facilities such as ASP, ACTIVEX®, ANSI® C++/C #, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, and the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the present disclosure discloses a method for automatically generating and providing contextual responses to user interaction.

In an embodiment, the method of present disclosure blends data received from various input channels of a user interaction for making real-time predictions of a context of the user interaction and generating accurate contextual responses to the interaction.

In an embodiment, the present disclosure discloses providing goal-oriented user output based on trained models, which are trained with data from various input channels. The goal-oriented user output helps in predicting user's reaction to the contextual responses provided to the user.

In an embodiment, the response generation system of the present disclosure may be used to automatically drive a conversation with a user, thereby eliminating human intervention/requirement for carrying out the conversion.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | User |
| 103 | Input channels |
| 105 | Response generation system |
| 107 | Processing models |
| 109 | Contextual responses |
| 201 | I/O interface |
| 203 | Processor |
| 205 | Memory |
| 207 | Data |
| 209 | Modules |
| 210 | Input data |
| 211 | Interaction parameters |
| 213 | Contextual variable |
| 215 | Other data |
| 217 | Receiving module |
| 219 | Computation module |
| 221 | Context determination module |
| 223 | Other modules |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User/Application |
| 407 | Operating system |
| 408 | Web browser |
| 409 | Communication network |
| 411 | Input devices |
| 412 | Output devices |
| 413 | RAM |
| 414 | ROM |

We claim:

1. A method of providing contextual responses to user interaction, the method comprising:
   receiving, by a response generation system, input data, related to the user interaction, from each of a plurality of input channels in real-time;
   processing, by the response generation system, the input data using one or more processing models corresponding to each of the plurality of input channels for extracting plurality of interaction parameters from the input data;
   combining, by the response generation system, each of the plurality of interaction parameters for computing a contextual variable corresponding to the user interaction, wherein the contextual variable indicates a collective outcome of processing the input data by the one or more processing models;
   determining, by the response generation system, a context of the user interaction based on analysis of the contextual variable, wherein determining the context of the user interaction comprises:
      assigning a context score to the contextual variable based on comparison of the contextual variable with each of a plurality of predetermined emotion variables, wherein the contextual variable is assigned a highest context score when the contextual variable matches a predetermined emotional variable;
      identifying an emotion variable corresponding to the contextual variable based on the context score; and
      determining the context of the user interaction based on identified emotion variable; and
   generating, by the response generation system, one or more responses corresponding to the context of the user interaction for providing the contextual responses to the user interaction.

2. The method as claimed in claim 1, wherein the plurality of input channels comprises a voice input channel, a textual input channel, a visual input channel and a sensory input channel.

3. The method as claimed in claim 1, wherein each of the one or more processing models are configured with predetermined techniques for processing the input data received from corresponding each of the plurality of input channels.

4. The method as claimed in claim 1, wherein the plurality of interaction parameters comprise emotion of a user, gestures and facial expressions of the user and physiological factors associated with the user.

5. The method as claimed in claim 1, wherein each of the one or more processing models are trained with historical input data for identifying the plurality of interaction parameters in the input data.

6. The method as claimed in claim 1 further comprises training a goal-oriented prediction model with historical contextual variables and outcome of corresponding user interactions for predicting an outcome of the user interaction.

7. The method as claimed in claim 6, wherein the outcome of the user interaction is at least one of user acceptance or user rejection to the contextual responses provided to the user.

8. A response generation system for providing contextual responses to user interaction, the response generation system comprising:
   a processor; and
   a memory, communicatively coupled to the processor, wherein the memory stores processor-executable instructions, which on execution, cause the processor to:
   receive input data, related to the user interaction, from each of a plurality of input channels in real-time;
   process the input data using one or more processing models corresponding to each of the plurality of input channels to extract plurality of interaction parameters from the input data;
   combine each of the plurality of interaction parameters for computing a contextual variable corresponding to the user interaction, wherein the contextual variable indicates a collective outcome of processing the input data by the one or more processing models;
   determine a context of the user interaction based on analysis of the contextual variable, wherein determining the context of the user interaction comprises
      assigning a context score to the contextual variable based on comparison of the contextual variable with each of a plurality of predetermined emotion variables, wherein the contextual variable is assigned a highest context score when the contextual variable matches a predetermined emotional variable;
      identifying an emotion variable corresponding to the contextual variable based on the context score; and
      determining the context of the user interaction based on identified emotion variable; and
   generate one or more responses corresponding to the context of the user interaction to provide the contextual responses to the user interaction.

9. The response generation system as claimed in claim 8, wherein the plurality of input channels comprises a voice input channel, a textual input channel, a visual input channel and a sensory input channel.

10. The response generation system as claimed in claim 8, wherein the processor configures each of the one or more processing models with predetermined techniques for processing the input data received from corresponding each of the plurality of input channels.

11. The response generation system as claimed in claim 8, wherein the plurality of interaction parameters comprise emotion of a user, gestures and facial expressions of the user and physiological factors associated with the user.

12. The response generation system as claimed in claim 8, wherein the processor trains each of the one or more processing models with historical input data for identifying the plurality of interaction parameters in the input data.

13. The response generation system as claimed in claim 8, wherein the processor trains a goal-oriented prediction model with historical contextual variables and outcome of corresponding user interactions for predicting an outcome of the user interaction.

14. The response generation system as claimed in claim 13, wherein the outcome of the user interaction is at least one of user acceptance or user rejection to the contextual responses provided to the user.

* * * * *